United States Patent
Funk

(10) Patent No.: US 8,402,748 B2
(45) Date of Patent: Mar. 26, 2013

(54) DIESEL FUEL ALTERNATIVE DETECTION AND CORRECTION SYSTEMS AND METHODS

(75) Inventor: Sarah Funk, Canton, MI (US)

(73) Assignee: GM Global Technology Operations LLC

(*) Notice: Subject to any disclaimer, the term of this patent is extended or adjusted under 35 U.S.C. 154(b) by 336 days.

(21) Appl. No.: 12/714,881

(22) Filed: Mar. 1, 2010

(65) Prior Publication Data

US 2011/0173957 A1  Jul. 21, 2011

Related U.S. Application Data

(60) Provisional application No. 61/295,855, filed on Jan. 18, 2010.

(51) Int. Cl.
*F01N 3/025* (2006.01)
(52) U.S. Cl. ........ 60/285; 60/274; 60/276; 60/286; 60/295; 60/297; 60/299; 60/303; 60/311
(58) Field of Classification Search ........ 60/274, 60/276, 285, 286, 295, 297, 299, 303, 311
See application file for complete search history.

(56) References Cited

U.S. PATENT DOCUMENTS

| | | | |
|---|---|---|---|
| 2004/0083717 A1* | 5/2004 | Zhu et al. ............... | 60/284 |
| 2006/0080025 A1* | 4/2006 | Wang et al. ............. | 701/106 |
| 2007/0163542 A1* | 7/2007 | Kettl et al. ............. | 123/435 |
| 2007/0204674 A1* | 9/2007 | Takaku ................... | 73/35.02 |
| 2008/0264036 A1* | 10/2008 | Bellovary ............... | 60/274 |
| 2009/0049824 A1* | 2/2009 | Kojima et al. .......... | 60/285 |
| 2010/0011748 A1* | 1/2010 | Yokota ................... | 60/286 |

* cited by examiner

*Primary Examiner* — Thomas Denion
*Assistant Examiner* — Jorge Leon, Jr.

(57) ABSTRACT

A fuel control system for a vehicle comprises a fuel control module, a heat release determination module, and a detection module. The fuel control module supplies fuel to a cylinder of a diesel engine for combustion within the cylinder. The heat release determination module determines a heat release value based on a pressure within the cylinder during the combustion. The detection module selectively indicates that the fuel is a diesel fuel alternative when the heat release value is less than a predetermined heat release value. The predetermined heat release value is less than a second predetermined heat release value associated with diesel fuel.

19 Claims, 5 Drawing Sheets

DIESEL FUEL ALTERNATIVE DETECTION AND CORRECTION SYSTEMS AND METHODS

CROSS-REFERENCE TO RELATED APPLICATIONS

This application claims the benefit of U.S. Provisional Application No. 61/295,855, filed on Jan. 18, 2010. The disclosure of the above application is incorporated herein by reference in its entirety.

FIELD

The present disclosure relates to internal combustion engines and more particularly to engine control systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Air is drawn into an engine through an intake manifold. A throttle valve controls airflow into the engine. The air mixes with fuel provided by one or more fuel injectors to form an air/fuel mixture. The air/fuel mixture is combusted within one or more cylinders of the engine. In diesel engine systems, combustion is initiated by injecting fuel into the cylinders. More specifically, heat generated by compression ignites injected fuel.

Combustion of the air/fuel mixture produces drive torque. More specifically, drive torque is generated through heat release and expansion that occurs during combustion of the air/fuel mixture. Torque is transferred by a crankshaft of the engine through a driveline to one or more wheels to propel a vehicle. Exhaust gas is expelled from the cylinders to an exhaust system.

An engine control module (ECM) controls the torque output of the engine based on a desired torque. The desired torque may be based on driver inputs, such as accelerator pedal position, brake pedal position, cruise control inputs, and/or other suitable driver inputs. The desired torque may also be based on torque requested by other vehicle systems, such as a transmission control system, a hybrid control system, and/or a chassis control system.

SUMMARY

A fuel control system for a vehicle comprises a fuel control module, a heat release determination module, and a detection module. The fuel control module supplies fuel to a cylinder of a diesel engine for combustion within the cylinder. The heat release determination module determines a heat release value based on a pressure within the cylinder during the combustion. The detection module selectively indicates that the fuel is a diesel fuel alternative when the heat release value is less than a predetermined heat release value. The predetermined heat release value is less than a second predetermined heat release value associated with diesel fuel.

A fuel control method for a vehicle comprises: supplying fuel to a cylinder of a diesel engine for combustion within the cylinder, determining a heat release value based on a pressure within the cylinder during the combustion, and selectively indicating that the fuel is a diesel fuel alternative when the heat release value is less than a predetermined heat release value. The predetermined heat release value is less than a second predetermined heat release value associated with diesel fuel.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
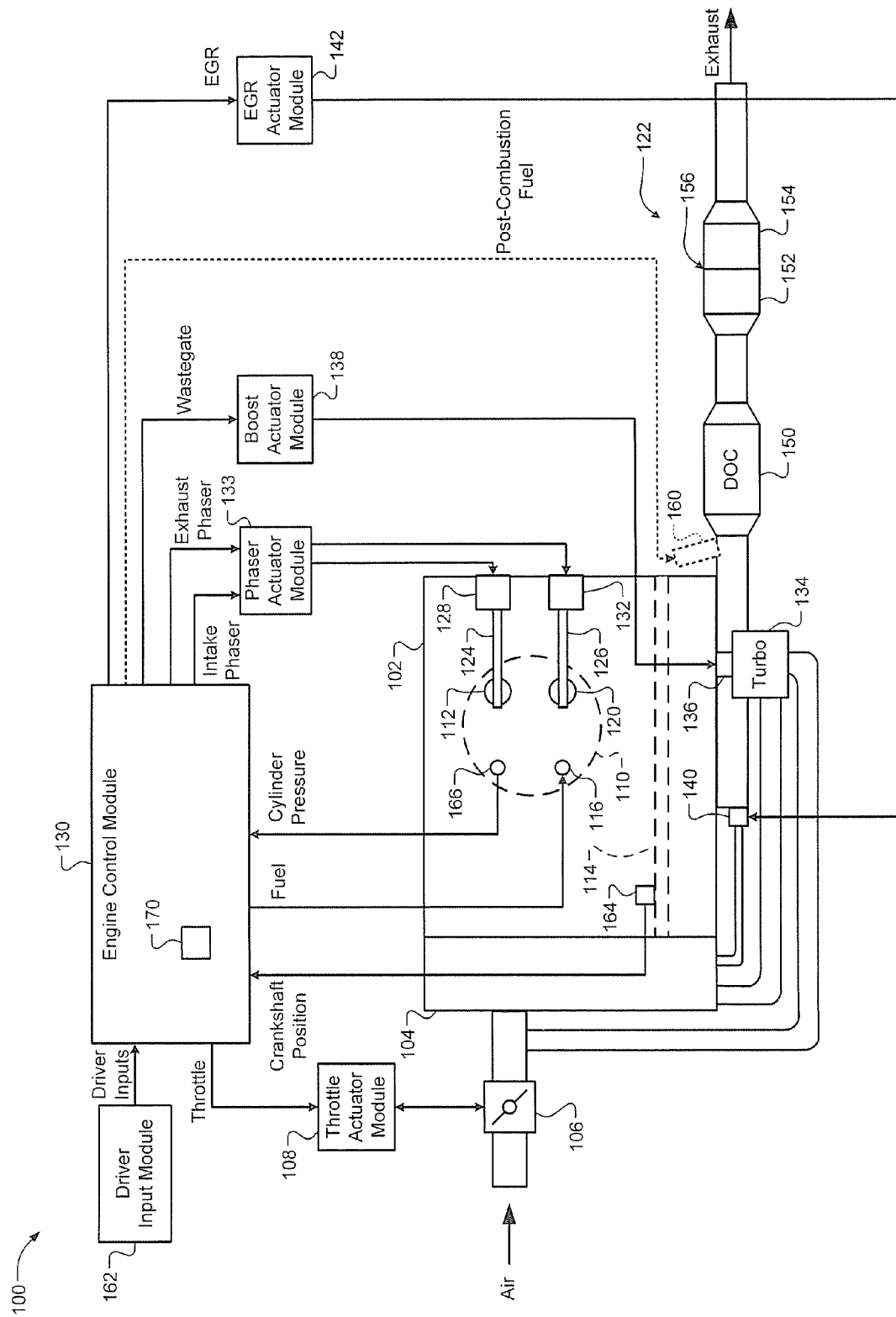
FIG. 1 is a functional block diagram of an exemplary diesel engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory including one or more software or firmware programs, and/or a combinational logic circuit, that provides the described functionality.

A diesel internal combustion engine combusts a mixture of air and fuel to generate drive torque. The fuel may include conventional diesel fuel (also called petrodiesel) and/or one or more diesel fuel alternatives. For example only, diesel fuel alternatives may include biodiesel fuel, biomass to liquid (BTL) diesel fuel, gas to liquid (GTL) diesel fuel, and/or other alternatives to conventional diesel fuel. Diesel fuel alternatives, however, generally have a lower energy content than conventional diesel fuel. For example only, diesel fuel alternatives may have a lower heat of combustion than conventional diesel fuel.

A control module supplies fuel to a cylinder of the diesel engine for combustion. The control module monitors pressure within the cylinder during combustion of the fuel and determines a heat release value based on the cylinder pressure. The control module of the present disclosure detects whether the fuel is a diesel fuel alternative based on the heat release value. For example only, the control module may determine that the fuel is a diesel fuel alternative when the heat release value is less than a predetermined value for a predetermined period.

Exhaust resulting from combustion within the diesel engine is exhausted to an exhaust system. The exhaust system includes a diesel oxidation catalyst (DOC) and a diesel particulate filter (DPF). In some circumstances, such as for regeneration of the DPF, the fuel is also supplied to the exhaust system. For example only, the fuel may be injected into the cylinder during an exhaust stroke of the cylinder and/or directly into the exhaust system at a location upstream of the DOC. The DOC oxidizes hydrocarbons of the fuel, the hydrocarbon oxidation produces heat, and the heat is directed downstream to the DPF by the flow of the exhaust.

However, the lower energy content of a diesel alternative may prevent completion of DPF regeneration. Incomplete DPF regeneration may cause an increased regeneration frequency (i.e., a next regeneration event may be initiated sooner than it would be if the regeneration was completed), which may reduce fuel economy (as the fuel will be supplied to the exhaust system more often) and decrease the lifetime of the DPF.

The control module of the present disclosure determines a target amount of fuel to be supplied to the exhaust system for DPF regeneration. When the fuel has been determined to be a diesel fuel alternative, the control module determines a fuel correction for the target amount and increases the target amount based on the fuel correction. The control module supplies the fuel to the exhaust system based on the increased target amount. Supplying fuel for DPF regeneration based on the increased target amount may allow the DPF regeneration to be completed despite the lower energy content of the diesel fuel alternative.

Referring now to FIG. 1, a functional block diagram of an exemplary diesel engine system 100 is presented. The diesel engine system 100 includes a diesel engine 102 that combusts a mixture of air and fuel to produce drive torque. The fuel may include conventional diesel fuel and/or one or more diesel fuel alternatives, such as biodiesel fuel, BTL diesel fuel, GTL diesel fuel, and/or other diesel fuel alternatives. One or more motor generator units (not shown) may also be implemented with the diesel engine system 100.

Air is drawn into an intake manifold 104 through a throttle valve 106. A throttle actuator module 108 controls opening of the throttle valve 106 and, therefore, airflow into the engine 102. The throttle actuator module 108 may include, for example, an electronic throttle controller (ETC).

Air from the intake manifold 104 is drawn into one or more cylinders of the engine 102. While the engine 102 may include multiple cylinders, for illustration purposes, only a single representative cylinder 110 is shown. The engine 102 may include one or more cylinders. Air from the intake manifold 104 is drawn into the cylinder 110 through an associated intake valve 112. More than one intake valve may be associated with the cylinder 110.

The engine 102 may operate using a four-stroke combustion cycle. The four strokes, described below in conjunction with a combustion cycle of the cylinder 110, may be referred to as an intake stroke, a compression stroke, a combustion stroke (also referred to as an expansion stroke), and an exhaust stroke. During each revolution of a crankshaft 114, two of the four strokes occur within the cylinder 110. Therefore, two revolutions (i.e., 720°) of the crankshaft 114 may be necessary for the cylinder 110 to experience all four of the strokes of one combustion cycle.

The crankshaft 114 lowers a piston (not shown) within the cylinder 110 toward a bottom most position during the intake stroke. The bottom most position may be referred to as a bottom dead center (BDC) position. The lowering of the piston draws air into the cylinder 110. After the piston reaches the BDC position, the compression stroke begins. During the compression stroke, the piston moves toward a topmost position and compresses the air within the cylinder 110. The topmost position may be referred to as a top dead center (TDC) position. The compression of the air within the cylinder 110 generates heat.

Heat generated by the compression of the air within the cylinder 110 may initiate combustion of fuel when the fuel is injected into the cylinder 110. An engine control module (ECM) 130 controls the amount (e.g., mass) of fuel injected into the cylinder 110 by a fuel injector 116. For example only, the ECM 130 may control the period of time that the fuel injector 116 is maintained in a fully open position, which may be referred to as an injection pulse width. The ECM 130 may vary the pulse width to control the amount of fuel injected into the cylinder 110. More than one fuel injector may be associated with the cylinder 110.

The ECM 130 may control the time when fuel is injected into the cylinder 110 relative to, for example, the TDC position or the BDC position. Combustion of the fuel drives the piston toward BDC during the combustion stroke. The combustion of the fuel drives rotation of the crankshaft 114 and generates drive torque.

After the piston reaches the BDC position, the exhaust stroke begins, and the crankshaft 114 drives the piston toward the TDC position. The piston expels the byproducts of combustion through an associated exhaust valve 120. More than one exhaust valve may be associated with the cylinder 110. The byproducts of combustion are exhausted from the cylinder 110 to an exhaust system 122.

The intake valve 112 is controlled by an intake camshaft 124, and the exhaust valve 120 is controlled by an exhaust camshaft 126. In other implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders.

An intake cam phaser 128 controls the intake camshaft 124 and, therefore, controls opening (e.g., lift, timing, and duration) of the intake valve 112. Similarly, an exhaust cam phaser 132 controls the exhaust camshaft 126 and, therefore, controls opening (e.g., lift, timing, and duration) of the exhaust valve 120. The timing of the opening of the intake and exhaust valves 112 and 120 may be specified relative to, for example, the TDC position or the BDC position. A phaser actuator module 133 controls the intake cam phaser 128 and the exhaust cam phaser 132 based on signals from the ECM 130.

The diesel engine system 100 may also include a boost device that provides pressurized air to the intake manifold 104. For example only, the diesel engine system 100 shown in FIG. 1 includes a turbocharger 134. The turbocharger 134 is powered by exhaust flowing through the exhaust system 122 and provides a compressed air charge to the intake manifold 104. The turbocharger 134 may include a variable geometry turbocharger (VGT), a variable nozzle turbocharger (VNT), or another suitable type of turbocharger. Other engine systems may also include more than one turbocharger and/or other types of boost devices (e.g., a supercharger).

A wastegate 136 may selectively allow exhaust to bypass the turbocharger 134, thereby reducing the turbocharger's output (or boost). A boost actuator module 138 may control the boost of the turbocharger 134 based on signals from the ECM 130. The boost actuator module 138 may control the boost of the turbocharger 134 by, for example, controlling the position of the wastegate 136 and/or the turbocharger 134 itself (e.g., vane position).

The diesel engine system 100 may also include an exhaust gas recirculation (EGR) valve 140, which selectively directs exhaust back to the intake manifold 104. An EGR actuator module 142 controls opening of the EGR valve 140 based on signals from the ECM 130. The EGR opening may be adjusted to adjust one or more combustion parameters and/or to adjust the boost of the turbocharger 134.

Exhaust that is not directed back to the intake manifold 104 may flow through the turbocharger 134/wastegate 136 to a diesel oxidation catalyst (DOC) 150. The DOC 150 selectively oxidizes hydrocarbons passing through the DOC 150. The exhaust may flow from the DOC 150 to a selective catalytic reduction (SCR) catalyst 152. In some implementations, the SCR catalyst 152 may be implemented with a diesel particulate filter (DPF) 154 within a common housing 156. The SCR catalyst 152 may absorb ammonia and catalyze a reaction between ammonia and nitrogen oxides (NOx).

The DPF 154 may filter particulate from the exhaust as the exhaust flows through the DPF 154. Particulate filtered from the exhaust may accumulate within the DPF 154 over time. Particulate within the DPF 154 may be cleared (e.g., burned) from the DPF 154 through a process referred to as regeneration.

DPF regeneration may be performed, and particulate may combust, at temperatures greater than a combustion temperature, such as 600-850° C. Heat for DPF regeneration may be provided by the DOC 150. More specifically, hydrocarbon oxidation by the DOC 150 generates heat that is directed downstream to the DPF 154 by the flow of the exhaust.

The ECM 130 may control the provision of hydrocarbons to the DOC 150 for DPF regeneration. More specifically, injected fuel may provide the hydrocarbons for DPF regeneration, and the ECM 130 may control the amount of fuel supplied for DPF regeneration. Fuel provided for DPF regeneration may be referred to as post-combustion fueling as it is injected into the cylinder 110 after combustion or into the exhaust system 122 downstream of the engine 102.

For example only, the ECM 130 may inject fuel into the cylinder 110 via the fuel injector 116 during the exhaust stroke of the cylinder 110. Fuel injected during the exhaust stroke is exhausted from the cylinder 110 to the exhaust system 122 for hydrocarbon oxidation by the DOC 150.

For another example only, fuel may be injected directly into the exhaust system 122 at a location upstream of the DOC 150. For example only, a post-combustion fuel injector 160 may be located near an inlet of the DOC 150. The ECM 130 may control the amount of fuel injected by the post-combustion fuel injector 160 for DPF regeneration.

The ECM 130 regulates the torque output of the engine 102 based on driver inputs and other inputs. The driver inputs may include, for example, accelerator pedal position, brake pedal position, cruise control inputs, and/or other suitable driver inputs. A driver input module 162 may provide the driver inputs to the ECM 130. The other inputs (not shown) may include inputs from, for example, one or more sensors and/or one or more vehicle control modules (not shown), such as a transmission control module, a hybrid control module, and a chassis control module.

The ECM 130 receives a crankshaft position signal from a crankshaft sensor 164. The crankshaft sensor 164 generates the crankshaft position signal based on a position of the crankshaft 114. For example only, the crankshaft sensor 164 may include a variable reluctance (VR) sensor or another suitable type of crankshaft sensor. The crankshaft position signal may include a pulse train. Each pulse of the pulse train may be generated as a tooth of an N-toothed wheel (not shown) that rotates with the crankshaft 114 passes the VR sensor. Accordingly, each pulse corresponds to an angular rotation of the crankshaft 114 by an amount equal to 360° divided by N teeth. The N-toothed wheel may also include a gap of one or more missing teeth, and the gap may be used as an indicator of one complete revolution of the crankshaft 114.

The crankshaft position signal may be used to determine the rotational speed of the crankshaft 114 (i.e., engine speed) in revolutions per minute (rpm). For example only, the engine speed may be determined based on the period of time between the pulses of the pulse train. The ECM 130 also receives a cylinder pressure signal from a cylinder pressure sensor 166. The cylinder pressure sensor 166 measures a pressure within the cylinder 110 and generates the cylinder pressure signal accordingly.

In some engine systems having more than one cylinder, only the single cylinder pressure sensor 166 may be provided. In other engine systems, one or more cylinder pressure sensors like the cylinder pressure sensor 166 may be provided. For example only, one cylinder pressure sensor may be provided for each cylinder. The ECM 130 may also receive signals from other sensors, such as an engine coolant temperature sensor, a manifold absolute pressure (MAP) sensor, a mass air flow (MAF) sensor, a throttle position sensor, an intake air temperature (IAT) sensor, and/or other suitable sensors.

The ECM 130 of the present disclosure includes a fuel control module 170 that supplies fuel to the cylinder 110 for combustion. The fuel control module 170 monitors the cylinder pressure measured during combustion of the fuel and determines a heat release value for the fuel based on the cylinder pressure.

The fuel control module 170 determines whether the fuel is a diesel fuel alternative (e.g., biodiesel) based on a comparison of the heat release value and a predetermined heat release value for diesel fuel alternatives. When the fuel is a diesel fuel alternative, the amount of post-injection fuel supplied for DPF regeneration may be increased to compensate for the lower energy content of the diesel fuel alternative.

Figure 2:
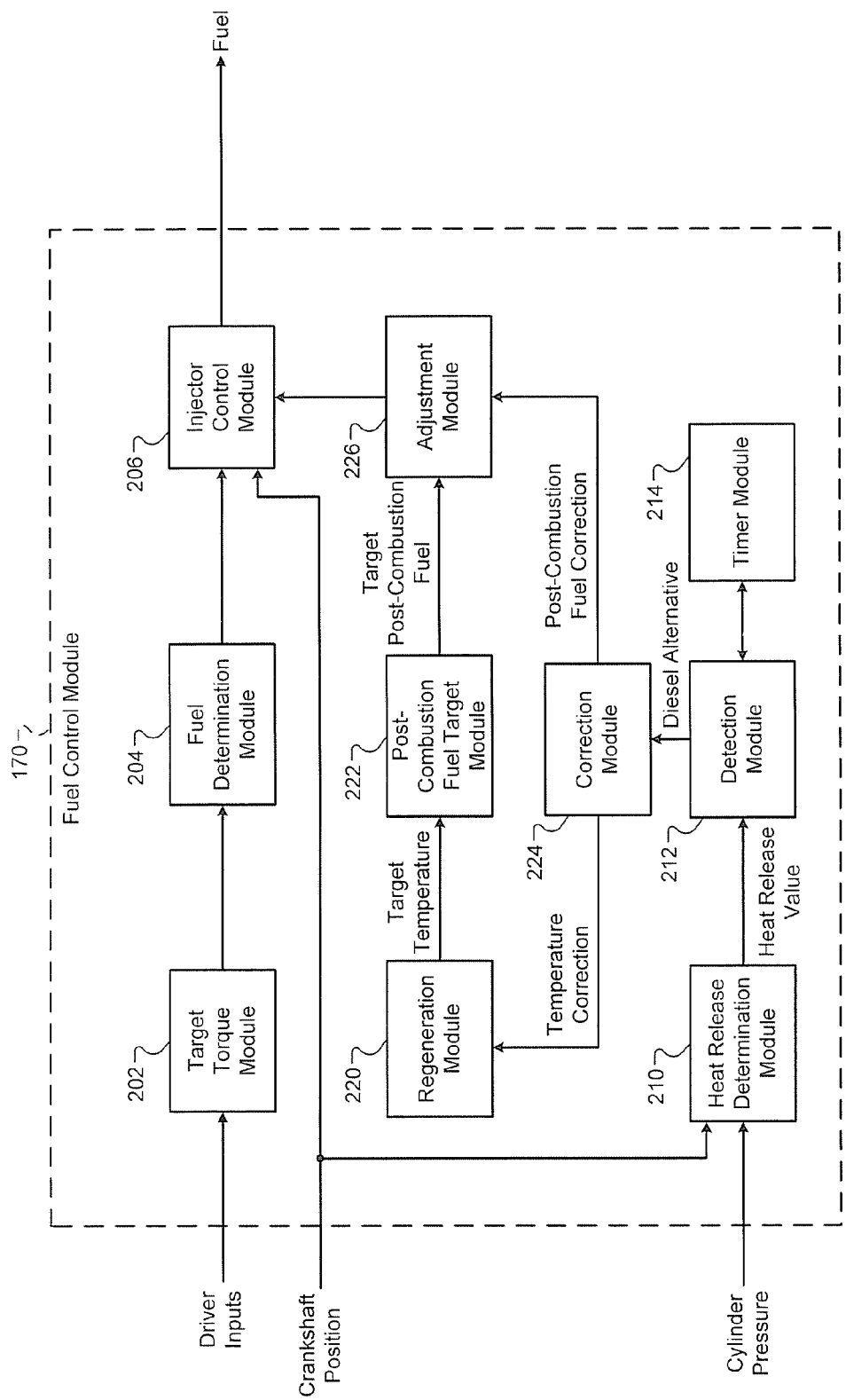
FIG. 2 is a functional block diagram of an exemplary fuel control module according to the principles of the present disclosure.

Referring now to FIG. 2, a functional block diagram of an exemplary implementation of the fuel control module 170 is presented. The fuel control module 170 may include a target torque module 202, a fuel determination module 204, and an injector control module 206. The fuel control module 170 may also include a heat release determination module 210, a detection module 212, and a timer module 214.

The target torque module 202 may determine a target engine torque and provide the target engine torque to the fuel determination module 204. The target torque module 202 may determine the target engine torque based on the driver inputs, torque requested by various vehicle systems, operating parameters, and/or other suitable parameters.

The fuel determination module 204 may determine a target amount (e.g., mass) of fuel for combustion within the cylinder 110 based on the target engine torque. The fuel determination module 204 may determine the target amount of fuel, for example, from a mapping of target fuel amounts indexed by target engine torques.

The injector control module 206 supplies the target amount of fuel to the cylinder 110 for combustion within the cylinder 110. In other words, the injector control module 206 controls opening of the fuel injector 116 to supply the target amount of fuel to the cylinder 110. The injector control module 206 may control the amount of fuel supplied by controlling, for example, the period of time that the fuel injector 116 is maintained in the fully open position (i.e., the fuel injection pulse width). The injector control module 206 may determine when to supply the fuel to the cylinder 110 for the combustion based on the crankshaft position.

The heat release determination module 210 may monitor the cylinder pressure measured by the cylinder pressure sensor 166 during combustion of the fuel. The heat release determination module 210 may determine a heat release value based on the cylinder pressure when the crankshaft 114 is at one or more crankshaft positions during the combustion.

For example only, the heat release determination module 210 may determine a heat release rate for each crankshaft position during the combustion. The heat release determination module 210 may determine the heat release rate for a given crankshaft position based on the crankshaft position, the cylinder pressure at the crankshaft position, a crankshaft position where the combustion of the fuel began, where the cylinder 110 is in a predetermined firing order, and other suitable parameters. Units of the heat release rate may be, for example, J/crankshaft angle degree (CAD).

The heat release determination module 210 may additionally or alternatively determine a total heat release for the combusted fuel. For example only, the heat release determination module 210 may multiply each of the heat release rates by a predetermined CAD (e.g., 1 CAD) to determine heat releases, respectively, in units of J. The heat release determination module 210 may determine a maximum and a minimum of the heat releases and may determine the total heat release based on a difference between the maximum and the minimum heat release.

The heat release determination module 210 may additionally or alternatively determine an average heat release rate for the combusted fuel as an average of the heat release rates during the combustion. The average may be determined based on a quotient of a sum of the heat release rates during the combustion over the number of heat release rates used in determining the sum.

The heat release determination module 210 may additionally or alternatively determine a heat release parameter for the combusted fuel based on the average heat release rate and a number of CAD during which the combustion occurred. For example only, the heat release determination module 210 may determine the heat release parameter (e.g., J) based on a product of the average heat release and the number of CAD.

The heat release determination module 210 may additionally or alternatively determine a heating value for the combusted fuel based on the amount of the fuel combusted and one of the heat release parameter and the total heat release. For example only, the heat release determination module 210 may determine the heating value (e.g., J/g) based on a quotient of the heat release parameter over the amount of the fuel combusted or a quotient of the total heat release over the amount of the fuel combusted. In various implementations, the heat release rate at a predetermined CAD, the total heat release, the average heat release rate, the heat release parameter, or the heating value may be used as the heat release value.

The detection module 212 receives the heat release value from the heat release determination module 210 and may determine whether the fuel is a diesel fuel alternative based on the heat release value. In other words, the detection module 212 determines whether the fuel is conventional diesel fuel (i.e., petrodiesel) or an alternative to diesel fuel.

The detection module 212 selectively determines that the fuel is a diesel fuel alternative when the heat release value is less than a predetermined heat release value associated with diesel fuel alternatives. The predetermined heat release value is less than another predetermined heat release value associated with diesel fuel. For example only, when the heat release value is the heating value, the predetermined heat release value may be approximately 45,000 J/g.

The detection module 212 may increment a timer in the timer module 214 when the heat release value is less than the predetermined heat release value. The detection module 212 may also reset the timer to a predetermined reset value before incrementing the timer for a first time after, for example, a vehicle startup (e.g., key ON).

The detection module 212 may monitor the timer and may determine that the fuel is a diesel fuel alternative when the timer is greater than a predetermined period. In this manner, the detection module 212 may determine that the fuel is a diesel fuel alternative when the heat release value is less than the predetermined heat release value for the predetermined period. For example only, the predetermined period may be approximately 30 seconds.

The detection module 212 generates a diesel alternative signal that indicates whether the fuel is a diesel fuel alternative. For example only, the detection module 212 may set the diesel alternative signal to an active state (e.g., 5 V) when the fuel is a diesel alternative fuel. The diesel alternative signal may otherwise remain in an inactive state (e.g., 0 V).

In various implementations, such as in vehicle systems without the post-combustion fuel injector 160, the fuel control module 170 may also include a regeneration module 220, a post-combustion fuel target module 222, a correction module 224, and an adjustment module 226. In other implementations, such as in some vehicle systems having the post-combustion fuel injector 160, the regeneration module 220, the post-combustion fuel target module 222, the correction module 224, and the adjustment module 226 may be implemented within an exhaust control module 290 as shown in the exemplary embodiment of FIG. 3.

The regeneration module 220 may determine a target temperature for a regeneration event of the DPF 154. For example only, the target temperature may be a predetermined temperature, and the predetermined temperature may be approximately 600-850° C. for the regeneration event when diesel fuel is being supplied.

The regeneration module 220 may determine when to initiate the regeneration event based on, for example, an amount (e.g., a mass) of particulate within the DPF 154. The amount of particulate within the DPF 154 may be referred to as loading. For example only, the regeneration module 220 may initiate the regeneration event when the amount of particulate within the DPF 154 is greater than a predetermined amount.

The post-combustion fuel target module 222 determines a target amount (e.g., mass) of fuel for post-combustion injection (Target Post-Combustion Fuel) based on the target temperature. For example only, the post-combustion fuel target module 222 may determine the target amount based on a mapping of target amounts indexed by target temperature.

When the fuel is a diesel fuel alternative, however, the lower energy content of the diesel fuel alternative may prevent the target temperature from being achieved if only the target amount of post-combustion fuel is injected. Additionally, particulate matter resulting from combustion of a diesel fuel alternative may be combusted at temperatures greater than the combustion temperature of particulate matter resulting from combustion of diesel fuel.

The correction module 224 receives the diesel alternative signal and determines a post-combustion fuel correction. The correction module 224 may determine the post-combustion fuel correction based on a difference between the heat release value of the fuel and the predetermined heat release value associated with diesel fuel.

For example only, the post-combustion fuel correction may include a value that is greater than or equal to 1.0. The post-combustion fuel correction may be approximately 1.0 when the fuel is diesel fuel, and the post-combustion fuel correction may be greater than 1.0 when the fuel is a diesel fuel alternative. For example only, the post-combustion fuel correction may increase as the difference between the heat release value for the fuel and the predetermined heat release value associated with diesel fuel increases. In other implementations, the post-combustion fuel correction may include a predetermined correction greater than 1.0 when the fuel is a diesel fuel alternative.

The correction module 224 may also determine a temperature correction for the target temperature. The correction module 224 may determine the temperature correction based on a difference between the heat release value of the fuel and the predetermined heat release value associated with diesel fuel.

For example only, the temperature correction may be a value greater than or equal to 1.0. The temperature correction may be approximately 1.0 when the fuel is diesel fuel, and the temperature correction may be greater than 1.0 when the fuel is a diesel fuel alternative. For example only, the temperature correction may increase as the difference between the heat release value for the fuel and the predetermined heat release value for diesel fuel increases.

The correction module 224 may provide the temperature correction to the regeneration module 220 and may provide the post-combustion fuel correction to the adjustment module 226. In various implementations, the regeneration module 220 may adjust the target temperature before outputting the target temperature to the post-combustion fuel target module 222. For example only, the regeneration module 220 may adjust the target temperature by multiplying the target temperature by the temperature correction. In this manner, the regeneration module 220 may increase the target temperature when a diesel fuel alternative is been detected. In various implementations, the regeneration module 220 may also decrease a lower target temperature based on the temperature correction.

The adjustment module 226 may determine an adjusted target amount (e.g., mass) of fuel for post-combustion fueling based on the target amount and the post-combustion fuel correction. For example only, the adjustment module 226 may determine the adjusted target amount based on a product of the target amount and the post-combustion fuel correction. In this manner, the adjustment module 226 increases the target amount when a diesel fuel alternative is detected to compensate for the lower energy content of the diesel fuel alternative.

The adjustment module 226 supplies the adjusted target amount to the injector control module 206. The injector control module 206 selectively supplies fuel to the cylinder 110 based on the adjusted target amount when the supplied fuel will be exhausted from the cylinder 110 to the exhaust system 122. For example only, the injector control module 206 may supply the fuel during the exhaust stroke of the cylinder 110. In this manner, the injector control module 206 supplies fuel for DPF regeneration based on the adjusted target amount.

Figure 3:
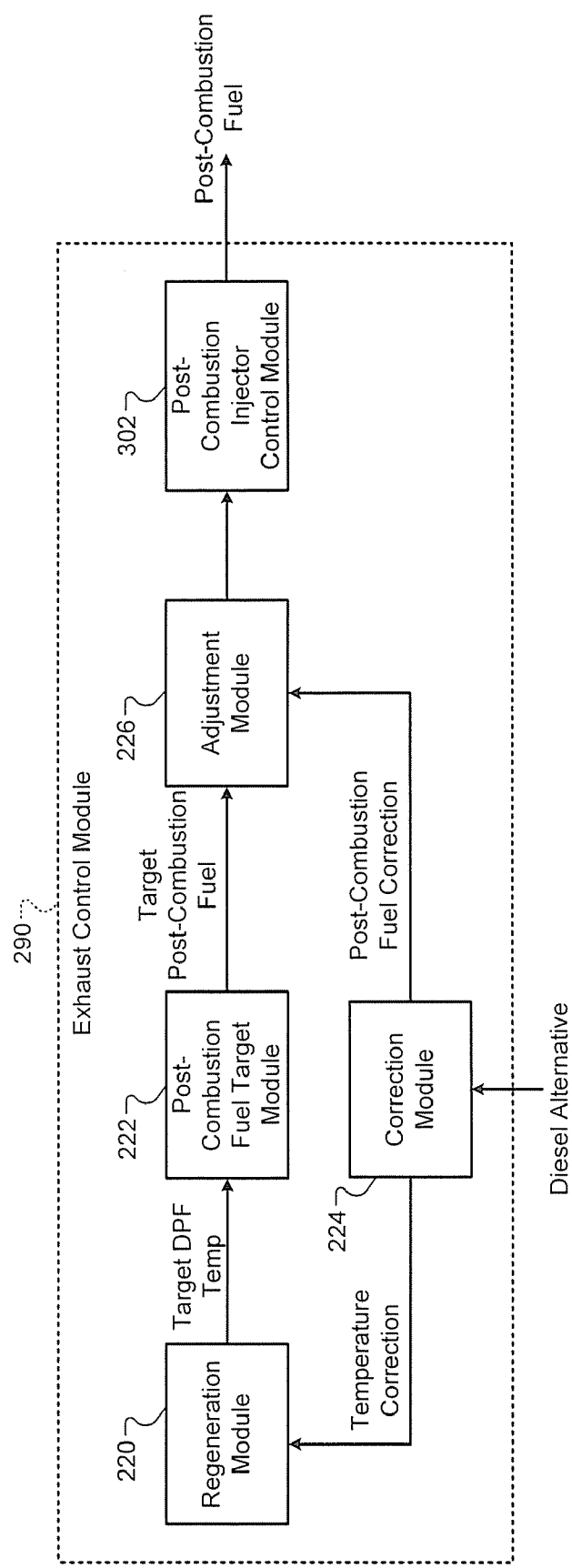
FIG. 3 is a functional block diagram of an exemplary exhaust control module according to the principles of the present disclosure.

Referring now to FIG. 3, a functional block diagram of an exemplary implementation of the exhaust control module 290 is presented. In vehicles that include the post-combustion fuel injector 160, the adjustment module 226 may provide the adjusted target amount to a post-combustion injector control module 302. The post-combustion injector control module 302 supplies fuel to the exhaust system (and more particularly to the DOC 150) based on the adjusted target amount via the post-combustion fuel injector 160.

While the correction module 224 is depicted in both FIG. 2 and FIG. 3, the post-combustion fuel correction determined in FIG. 2 may be different than the post-combustion fuel correction determined in FIG. 3. This difference may be attributable to the physics involved with injection of the post-combustion fuel at different locations. In other words, the post-combustion fuel correction for when post-combustion fuel is injected into the cylinder 110 and exhausted to the exhaust system 122 may be different from the post-combustion fuel correction for when post-combustion fuel is injected directly into the exhaust system 122 upstream of the DOC 150.

Figure 4:
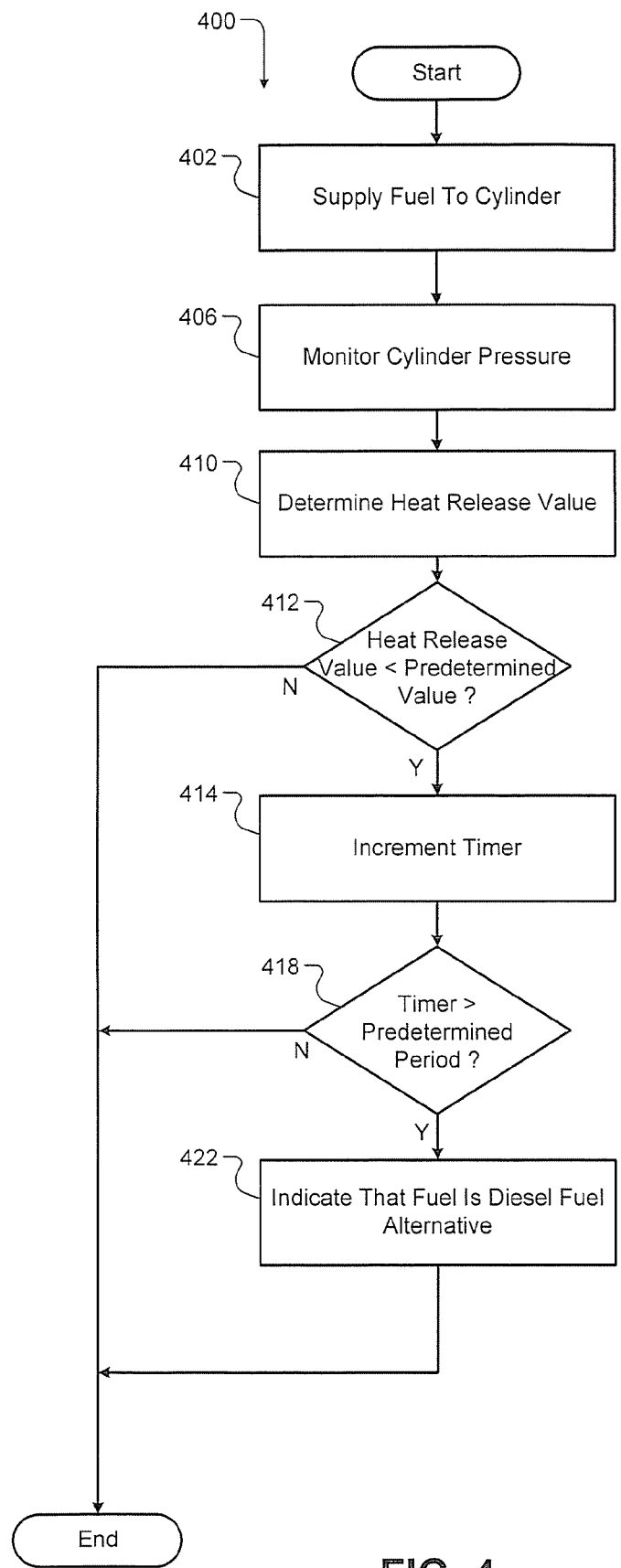
FIG. 4 is a flowchart depicting an exemplary method of detecting a diesel fuel alternative according to the principles of the present disclosure.

Referring now to FIG. 4, a flowchart depicting an exemplary method 400 is presented. Control may begin in 402 where control supplies fuel to the cylinder 110 for combustion. Control monitors the cylinder pressure measured by the cylinder pressure sensor 166 during the combustion in 406.

In 410, control determines the heat release value for the supplied fuel. Control determines whether the heat release value is less than the predetermined value associated with diesel fuel alternatives in 412. If true, control increments a timer in 414 and proceeds to 418; if false, control ends. The predetermined value for diesel fuel alternatives is less than the predetermined heat release value associated with diesel fuel.

Control determines whether the timer is greater than the predetermined period in 418. If true, control indicates that the supplied fuel is a diesel fuel alternative in 422 and control may end; if false, control may end. For example only, the predetermined period may be approximately 30 s. In this manner, control may determine that the supplied fuel is a diesel fuel alternative when the heat release value is less than the predetermined value associated with diesel fuel alternatives for at least the predetermined period.

Figure 5:
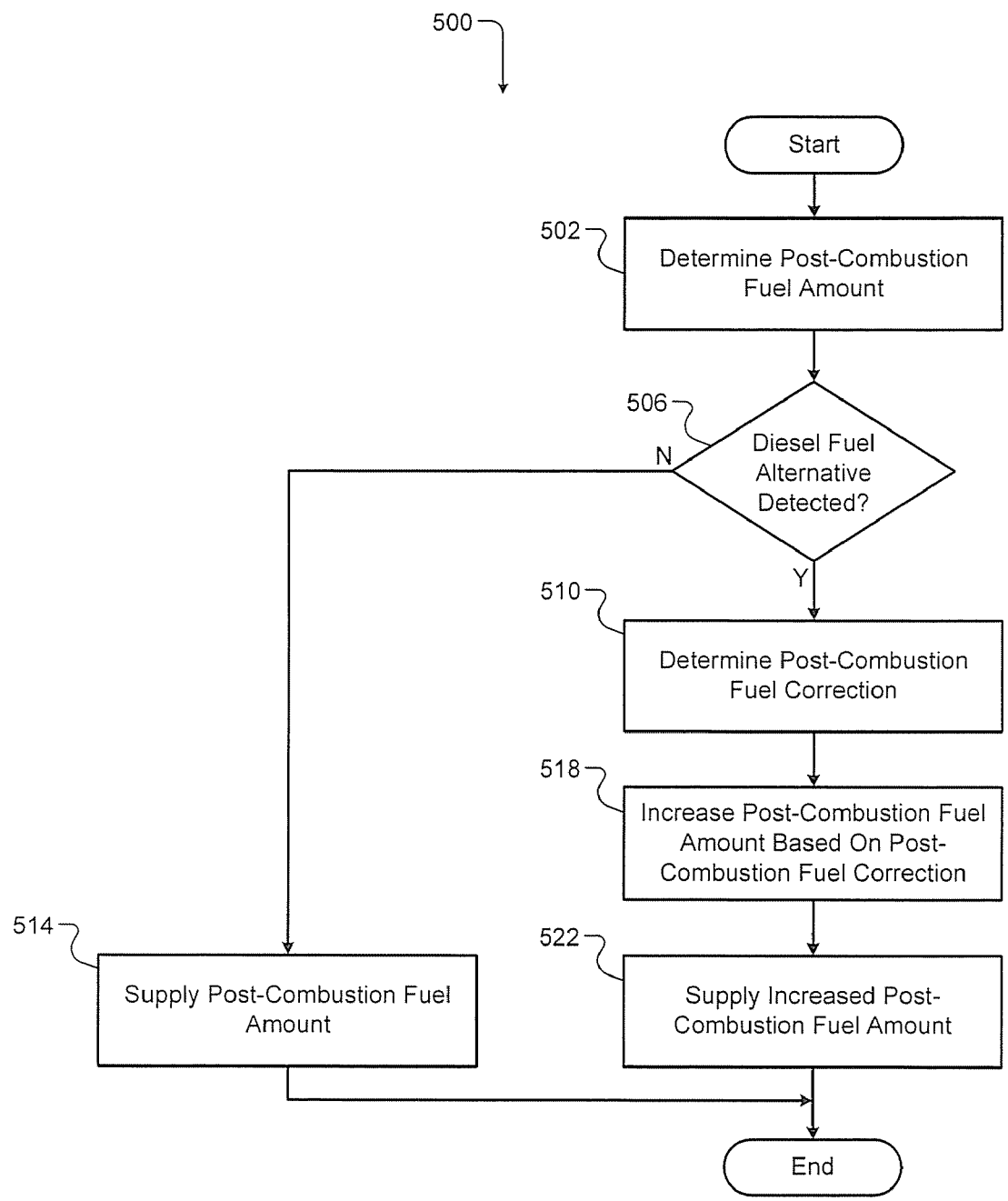
FIG. 5 is a flowchart depicting an exemplary method of controlling post-combustion fueling according to the principles of the present disclosure.

Referring now to FIG. 5, a flowchart depicting an exemplary method 500 is presented. Control may begin in 502 where control determines the target amount for post-combustion fueling. For example only, control may determine the target amount based on a target temperature for DPF regeneration.

In 506, control determines whether a diesel fuel alternative has been detected. If true, control proceeds to 510; if false, control supplies the target post-combustion fuel amount in 514 and control ends. In this manner, when a diesel fuel alternative is not detected, control supplies the target post-combustion fuel amount.

Control determines the post-combustion fuel correction in 510. Control may determine the post-combustion fuel correction based on a difference between the heat release value and the predetermined heat release value of diesel fuel. For example only, the post-combustion fuel correction may increase (above 1.0) as the difference between the heat release value of the fuel and the predetermined heat release value of diesel fuel increases.

Control increases the target post-combustion amount based on the post-combustion fuel correction in 518. For example only, control may increase the target post-combustion amount by multiplying the target post-combustion amount by the post-combustion fuel correction. Control supplies the increased target post-combustion amount in 522, and control ends. In this manner, control supplies more of the fuel than control would have if the fuel was diesel fuel to compensate for the lower energy content of the diesel fuel alternative.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A fuel control system for a vehicle, comprising:
    a first electronic circuit configured to supply fuel to a cylinder of a diesel engine for combustion within the cylinder;
    a second electronic circuit configured to determine a plurality of heat release rates based on a plurality of pressures within the cylinder at a plurality of crankshaft positions during the combustion, respectively, a crankshaft position where the combustion began, and location of the cylinder in a predetermined firing order of the diesel engine, to determine a plurality of heat release amounts based on the heat release rates, respectively, and to determine a heat release value based on a difference between a maximum one and a minimum one of the heat release amounts;
    a third electronic circuit configured to selectively indicate that the fuel is a diesel fuel alternative when the heat release value is less than a predetermined heat release value,
    wherein the predetermined heat release value is less than a second predetermined heat release value associated with diesel fuel;
    a fourth electronic circuit configured to initiate regeneration of a diesel particulate filter (DPF) when an amount of particulate within the DPF is greater than a predetermined amount;
    a fifth electronic circuit configured to determine a target amount of diesel fuel to be supplied to an exhaust system for the regeneration of the DPF;
    a sixth electronic circuit configured to determine a correction for the target amount based on the heat release value and the second predetermined heat release value; and
    a seventh electronic circuit configured to increase the target amount based on the correction,
    wherein the first electronic circuit is further configured to supply the increased target amount of the fuel to the exhaust system for the regeneration of the DPF.

2. The fuel control system of claim 1 wherein the third electronic circuit is configured to indicate that the fuel is the diesel fuel alternative when the heat release value is less than the predetermined heat release value for a predetermined period.

3. The fuel control system of claim 1 wherein the first electronic circuit is configured to supply the increased target amount of the fuel to the cylinder during an exhaust stroke of the cylinder.

4. The fuel control system of claim 1 wherein the first electronic circuit is configured to supply the increased target amount using a post-combustion fuel injector that injects the fuel into the exhaust system at a location upstream of a diesel oxidation catalyst.

5. The fuel control system of claim 1 wherein the sixth electronic circuit is configured to determine the correction based on a difference between the heat release value and the second predetermined heat release value.

6. The fuel control system of claim 1 wherein the diesel fuel alternative is biodiesel fuel.

7. The fuel control system of claim 1 wherein the first, second, third, fourth, fifth, sixth, and seventh electronic circuits include at least one of an Application Specific Integrated Circuit (ASIC), a processor and memory including one or more programs, and a combinational logic circuit.

8. A fuel control method for a vehicle, comprising:
    supplying fuel to a cylinder of a diesel engine for combustion within the cylinder;
    determining a plurality of heat release rates based on a plurality of pressures within the cylinder at a plurality of crankshaft positions during the combustion, respectively, a crankshaft position where the combustion began, and location of the cylinder in a predetermined firing order of the diesel engine;
    determining a heat release value based on an average of the heat release rates;
    selectively indicating that the fuel is a diesel fuel alternative when the heat release value is less than a predetermined heat release value,
    wherein the predetermined heat release value is less than a second predetermined heat release value associated with diesel fuel;
    initiating regeneration of a diesel particulate filter (DPF) when an amount of particulate within the DPF is greater than a predetermined amount;
    determining a target amount of diesel fuel to be supplied to an exhaust system for the regeneration of the DPF;
    determining a correction for the target amount based on the heat release value and the second predetermined heat release value;
    increasing the target amount based on the correction; and
    supplying the increased target amount of the fuel to the exhaust system for the regeneration of the DPF.

9. The fuel control method of claim 8 further comprising indicating that the fuel is the diesel fuel alternative when the heat release value is less than the predetermined heat release value for a predetermined period.

10. The fuel control method of claim 8 further comprising supplying the increased target amount of the fuel to the exhaust system for the regeneration of the DPF by supplying the increased target amount of the fuel to the cylinder during an exhaust stroke of the cylinder.

11. The fuel control method of claim 8 further comprising supplying the increased target amount using a post-combustion fuel injector that injects the fuel into the exhaust system at a location upstream of a diesel oxidation catalyst.

12. The fuel control method of claim 8 further comprising determining the correction based on a difference between the heat release value and the second predetermined heat release value.

13. The fuel control method of claim 8 wherein the diesel fuel alternative is biodiesel fuel.

14. A fuel control method for a vehicle, comprising:
    supplying fuel to a cylinder of a diesel engine for combustion within the cylinder;
    determining a plurality of heat release rates based on a plurality of pressures within the cylinder at a plurality of crankshaft positions during the combustion, respectively, a crankshaft position where the combustion began, and location of the cylinder in a predetermined firing order of the diesel engine;

determining a plurality of heat release amounts based on the heat release rates, respectively;

determining a heat release value based on a difference between a maximum one and a minimum one of the heat release amounts;

selectively indicating that the fuel is a diesel fuel alternative when the heat release value is less than a predetermined heat release value, wherein the predetermined heat release value is less than a second predetermined heat release value associated with diesel fuel;

initiating regeneration of a diesel particulate filter (DPF) when an amount of particulate within the DPF is greater than a predetermined amount;

determining a target amount of diesel fuel to be supplied to an exhaust system for the regeneration of the DPF;

determining a correction for the target amount based on the heat release value and the second predetermined heat release value;

increasing the target amount based on the correction; and supplying the increased target amount of the fuel to the exhaust system for the regeneration of the DPF.

15. The fuel control method of claim 14 further comprising indicating that the fuel is the diesel fuel alternative when the heat release value is less than the predetermined heat release value for a predetermined period.

16. The fuel control method of claim 14 further comprising supplying the increased target amount of the fuel to the exhaust system for the regeneration of the DPF by supplying the increased target amount of the fuel to the cylinder during an exhaust stroke of the cylinder.

17. The fuel control method of claim 14 further comprising supplying the increased target amount using a post-combustion fuel injector that injects the fuel into the exhaust system at a location upstream of a diesel oxidation catalyst.

18. The fuel control method of claim 14 further comprising determining the correction based on a difference between the heat release value and the second predetermined heat release value.

19. The fuel control method of claim 14 wherein the diesel fuel alternative is biodiesel fuel.

* * * * *